United States Patent Office 3,156,531
Patented Nov. 10, 1964

3,156,531
HYDROGEN PEROXIDE PURIFICATION
Daniel B. Luten, Jr., and Robert E. Meeker, Berkeley, Calif., assignors to Shell Oil Company, a corporation of Delaware
No Drawing. Filed Apr. 15, 1959, Ser. No. 806,455
7 Claims. (Cl. 23—207)

This invention relates to the purification of hydrogen peroxide and especially the removal of dissolved acids from hydrogen peroxide. It deals with an improved method for carrying out such separations with ion exchange resins.

Ion exchange resins have been widely used for removing anions and/or cations from liquids, especially aqueous liquids. While some advantage has been taken of the ability of porous ion exchange resins to remove materials from liquids by physical adsorption, the greatest use of these resins has been for removal of ions by replacement with an ion from the resin. This method of purification is thus essentially a substitution of an innocuous, or at least less undesirable ion, for the undesirable ion which is removed from the liquid. Two general types of ion exchange resins are available for use in the removal of acids from solution. These are the weak base anion exchange resins which are amine-type ion exchange resins, and the strong base resins such as the quaternary ammonium-type ion exchange resins, etc. These weak base resins are quite satisfactory in the removal of stronger acids from solution. They are very inefficient, however, in the removal of weaker acids because the unfavorable equilibrium, i.e., the substantial hydrolysis of the corresponding salt under such circumstances results in low capacity and/or poor removal. Much better results are obtained with the strong base anion exchange resins. When these are used in the hydroxyl form the exchange takes place according to the equation:

$$R(NR'_3) \cdot OH + HA \rightleftharpoons R(NR'_3) \cdot A + H_2O$$

where R represents the resin matrix to which the quaternary ammonium groups (only one of which is shown in the equation) are linked, R' is a hydrocarbon, or substituted hydrocarbon, e.g., hydroxyalkyl radical, and A is the anion of the acid HA which is being removed. The equilibrium in this reaction is strongly to the right, primarily because the formation of water removes the products from the reaction. High resin capacities with complete acid removal are feasible and the water which is introduced into the liquid as a result of the exchange is usually unobjectionable. This method of operation can be used successfully, however, only in the purification of water or other media which are not affected detrimentally by the alkaline pH's which result from contact with these strong base ion exchange resins in hydroxyl form. It is not suitable with solutions of pH sensitive materials of which hydrogen peroxide is a well known example. This undesirable effect of pH can be minimized or even avoided in some cases by using the strong base anion exchange resin in salt form. However, with the salt forms which have been heretofore used, this results, at best, only in the substitution of a different acid for that which was undesired in the starting solution. In certain cases this may offer some advantages, but it is not as desirable as would be a method of acid removal which avoids any contamination of starting liquid. Furthermore, with previously used salt forms weak acids are only incompletely removed, and only a small fraction of the total capacity of the resin is utilized before breakthrough of weak acids.

An important object of the present invention is the provision of a new method for removing acids from solutions by means of ion excchange resins without introducing other materials into the hydrogen peroxide. Another object is to provide a method which can be used successfully to remove acids from hydrogen peroxide without undesirable change of the pH of the mixture. A special object is the removal of acid from hydrogen peroxide with anion exchange resins in special forms which avoid the disadvantages encountered in the previous use of these exchange resins. Still other objects and advantages of the invention will be apparent from the following description of the new process.

In accordance with the invention acids are removed from peroxidic media by contacting the hydrogen peroxide with a strong base anion exchange resin in the form of a salt of a polybasic acid which must be of a special type in relationship to the acid (HA) which is to be removed. The exchange resin salt used is one in which the quaternary ammonium exchange sites are predominantly taken up by anions (B) each linked to a plurality of exchange sites, these anions having a partly protonated form (HB) and a fully protonated, or zero charge, form ($H_nB$), where $n$ is a small positive whole number greater than one, such that $pK_{HA}$ is less than $pK_{HB}$ but greater than $pK_{H_nB}$. The symbols here employed are those customarily used for indicating the dissociation of acids. Thus $pK_{HA}$ represents the negative logarithm to the base 10 of $K_{HA}$ which is the acid dissociation constant of the substrate acid HA, to be removed, i.e., $$pK_{HA} = -\log_{10} K_{HA}$$

where

the brackets indicating concentration in moles per liter where H represents hydrogen ion and A is acid anion which can have one or more negative charges. Similarly $pK_{HB}$ represents the negative logarithm of the acid dissociation constant of the conjugate acid (partly protonated form), HB of the anion used to make the chosen salt of the strong base anion exchange resin employed so that $pK_{HB} = -\log_{10} K_{HB}$ where $$K_{HB} \text{ is } \frac{[H][B]}{[HB]}$$

In the same way $pK_{H_nB}$ is the negative logarithm of the acid dissociation constant of the fully protonated (zero charge) form of the anion B of the acid used in making the resin salt, i.e. $pK_{H_nB} = -\log_{10} K_{H_nB}$ where $$K_{H_nB} = \frac{[H][H_{n-1}B]}{[H_nB]}$$

By using strong base anion exchange resin salts which have this special relationship to the acidity of the acid which is to be removed from the liquid, the removal of the substrate acid takes places efficiently without contamination of the hydrogen peroxide by introduction of other components. At the same time the pH of the system can be controlled so that the removal can be successfully carried out in spite of the pH sensitivity of these liquids.

It is necessary that the pK of the substrate acid being removed be less than the pK of the conjugate acid (partly protonated form) of the anion used in making the resin salt in order that the desired acid removal will take place according to the equation in the case of a quaternary ammonium type resin salt, for example:

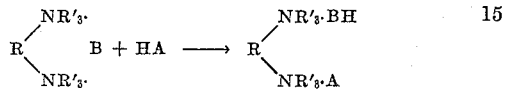

Due to the fact that the completely protonated form of the acid used in making the resin salt has a pK which is less than the pK of the acid being removed, there will be no displacement of anions from the resin and hence no contamination of the liquid under treatment. In other words, because $pK_{HA}$ is greater than $pK_{H_nB}$, anion exchange will be avoided.

The importance of the proper choice of acid for use in making the strong base anion exchange resin salt for removal of a given acid from a peroxide solution can be seen from a comparison of the use of sulfurous and sulfuric acid salts of a quaternary ammonium exchange resin in the removal of n-butyric acid impurity, for instance, from an aqueous solution. The pK value for n-butyric acid is 4.82. The pK values for the partially and fully protonated forms of sulfurous acid are 7.20 and 1.76 respectively. The sulfite salt of the quaternary exchange resin effectively removes the n-butyric acid according to the equation:

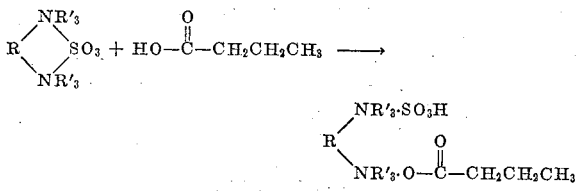

The solution is not exposed to a high pH during the removal. Also, there is no detectable exchange reaction according to the equation:

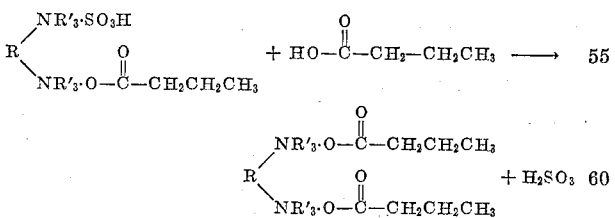

hence no contamination of the solution by exchange. In contrast, sulfuric acid salts of the resin are not satisfactory for this removal because the pK values of both protonated forms are lower than that of n-butyric acid, being 1.92 and about 0.40 so that very little reaction occurs.

By using a tribasic acid for making the strong base anion exchange resin salt, it is often possible to obtain higher resin capacities as a result of utilization of a greater proportion of the exchange sites of the resin. For example, when a quaternary ammonium-type anion exchange resin salt of arsenic acid (which has pK's of 9.22 and 7.08, respectively, for its first and second partially protonated forms and a pK of 2.30 in its fully protonated form) is used for the removal of lactic acid which has a pK of 3.86, one can start with the resin saturated with the trivalent ions and obtain removal according to the equation:

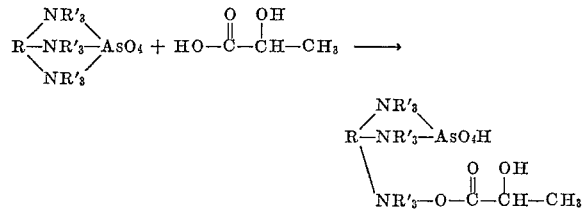

after which further removal can be obtained according to the equation:

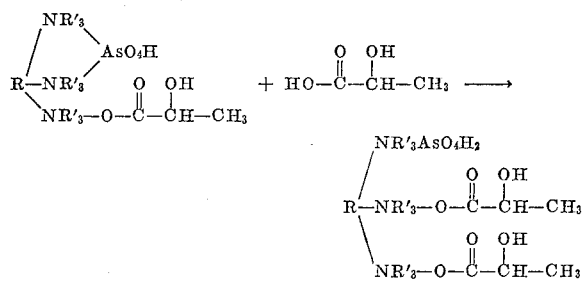

There is no danger, however, of further reaction which would result in displacement of arsenic acid from the resin to contaminate the liquid under treatment. Two-thirds of the resin sites are thus usefully employed as compared with only half the sites when resin salts of dibasic acids are used. A still higher capacity can be obtained by using a tetrabasic acid in making the quaternary ammonium exchange resin salt. Thus three-fourths of the sites are usable when employing pyrophosphoric acid salts for removal of an acid having a pK between 0.85 and 1.96 since pyrophosphoric acid has $pK_1=0.85$, $pK_2=1.96$, $pK_3=6.68$ and $pK_4=9.39$. Alternatively one can use the pyrophosphoric acid salts of quaternary ammonium exchange resins to remove acids which have a pK between 1.96 and 6.68, e.g., adipic acid (pK=4.43) in which case only two-thirds of the exchange sites will be utilized. Similarly the previously discussed arsenic acid salts of quaternary ammonium exchange resins can be used to remove from solution an acid of pK between 7.08 and 9.22 although at a sacrifice in resin capacity so that it is usually more advantageous to employ a resin salt of a dibasic acid having the required pK values for its partially and fully protonated forms. Hydrosulfuric acid where the pK's are 14.92 and 7.24 is one example of an acid which would be suitable for making quaternary ammonium anion exchange resin salts which would be suitable for removal of such acids, for instance, removal of hydrocyanic acid (pK=9.14).

As will be seen from the foregoing, the choice of acid to be used for making the strong base anion exchange resin salt will depend upon the nature of the acid or mixture of acids which it is desired to remove from the hydrogen peroxide under treatment. To facilitate removal of substrate acids of a wide range of acid strengths it is desirable to use on the strong base resin a polybasic acid anion which has the largest possible difference between the pK's of its mono- and fully protonated forms. In other words, $pK_{HB}-pK_{H_nB}$ should be as large as possible considering the pH and other requirements of the system. A $pK_{H_nB}$ as small as possible is advantageous for avoiding release of the fully protonated acid $H_nB$ into the liquid being purified. On the other hand, the $pK_{HB}$ of the monoprotonated form of the anion on the starting strong base anion exchange resin salt should be as large as possible for most efficient removal of the substrate acid. For example, salicylic acid salts of quaternary ammonium exchange resins provide versatility in acid removal since $pK_{HB}$ is 13.44 and $pK_{H_nB}$ is 2.97 ($n$ equals 2 in this case). As a result, mixtures of acids of widely different strengths can be removed with the resin salicylate. For instance, barbituric acid ($pK=3.98$) and glycine ($pK=9.78$) mixtures with or without acids of intermediate pK, e.g., p-toluic acid $pK=4.37$, can be efficiently removed on a column of this resin salt.

For selective removal of one acid from admixture with one or more other acids it may be more important to make the strong base anion exchange resin salt from acid whose anions have a smaller difference in $pK_{HB}$ and $pK_{H_nB}$ values. Thus by using the phthalic acid salt of quaternary ammonium anion exchange resin one can selectively remove uric acid (pK 3.89) from its mixtures with cyanuric acid (pK 6.74) since the mono- and fully protonated forms of phthalic acid have pK values of 5.41 and 2.89 respectively.

Consideration of pH is another factor which may limit the choice of acid used in making the strong base anion exchange resin salt. When treating a liquid which undergoes undesirable reaction at high pH it will be desirable to use a resin salt of an acid for which the $pK_{HB}$ is sufficiently low to avoid the undesired reaction. With hydrogen peroxide solutions the pH should be maintained below about 6.5 throughout the treatment.

Any strong base anion exchange resin which can be converted to the salts of the previously described type can be used in the process of the invention. As a class these resins are high molecular weight polybases which are virtually insoluble in the aqueous or organic media to be treated. They consist of a three-dimensional polymer network to which are attached a plurality of strongly basic groups which act as the anion exchangers. Especially suitable are the strongly basic quaternary ammonium anion exchange resins, typical of which are the products of amination with trimethyl amine or dimethyl ethanol amine of chloromethylated polymers, for example, chloromethylated styrene-divinyl benzene copolymers. Representative commercially available exchangers of these types are Amberlite IRA–400, IRA–401 and IRA–410 of Rohm and Haas Company, Dowex–1 and Dowex–2 of Dow Chemical Company, Nalcite SBR and SAR of National Aluminate Corp., Permutit S–2 of Permutit Co., and Duolite A–42 and A–40 of Chemical Process Co. U.S. Patents 2,388,235 and 2,591,573 describe processes for producing anion exchange resins which can be converted to salts which are useful in the invention.

Dowex 2 or Nalcite SAR is a quaternary ammonium base of the general formula RR'R''R'''N$^+$.A$^-$ in which one of the R's is derived from polystyrene, which in turn has been crosslinked with divinylbenzene. Two R-groups are methyl groups and one R-group is the hydroxy-ethyl group. The resultant anion exchange resin is a highly dissociated organic base, in which the large cationic body is limited in movement and the relatively small and mobile anion is free to exchange in a wide pH-range.

Dowex 1 or Nalcite SBR is a quaternary ammonium base of the general formula R.R'R''R'''N$^+$.A$^-$, in which one of the R's is derived from polystyrol which has been crosslinked with divinylbenzene. Three R-groups are methyl groups.

Other strongly basic anion exchange resins whose salts can be successfully used in the new process in the same way are the high polymers containing tertiary sulfonium groups and are commercially designed as Duolite ES 101 and Duolite ES 102. The former resin is a little more basic than the latter. Both resins have a capacity which is comparable with the capacity of Dowex 1 and 2. Among the tertiary sulfonium compounds those are preferred in which the sulfonium-sulfur atom bears 90–40% alkoxyaryl groups and 10–60% aryl groups and (or) aryl groups which are only substituted by alkyl groups. As an example for the synthesis of such polymers of tertiary sulfonium compounds, dry aluminum trichloride is dissolved in benzene and anisole. Dry sulfur dioxide is introduced and the mixture is heated. The tertiary sulfonium salt thus formed is isolated and condensed with paraformaldehyde, using concentrated sulfuric acid as catalyst. The resin thus formed is a strongly basic anion exchanger containing tertiary sulfonium radicals as functional groups. The tertiary sulfonium nucleus can also be prepared by the reaction of thionylchloride with anisole in the presence of aluminum trichloride, whereupon the tertiary sulfonium nuclei thus formed are crosslinked with paraformaldehyde in the presence of concentrated sulfuric acid.

Again, it is desired to emphasize that all these exchange resins are merely illustrative of the exchange resins which may be used and are not to be taken by way of limitation.

As the temperature is increased the life of the ion exchange resin decreases so it is desirable to carry out the purification at temperatures below 80° C. and more advantageously below 40° C. The preferred temperature is between the freezing point of the solution being treated and about 30° C., most preferably between about 10° and about 25° C. It is a special advantage of the invention, however, that longer resin life at higher temperatures can be achieved due to the fact that the hydroxyl form of the resin is avoided in the new process and quaternary ammonium decomposition thus eliminated.

Any of the conventional methods of contacting the chosen salt of the strong base anion exchange resin with the peroxide solution to be purified can be employed in the process of the invention. One simple method is to stir a slurry of the resin salt and the solution being treated for sufficient time for the desired reaction to come substantially to equilibrium. As a general rule a contact time of about 10 seconds to about 1 hour is usually adequate; while longer or shorter times can be used successfully, times of about ½ to about 15 minutes are preferred. The treated solution can be separated from the resin by decantation, filtration, or centrifugation and the resin reused in the process repeatedly.

Most advantageously the contact is by flow of the peroxide solution to be purified through a bed of the strong base anion exchange resin preferably a quaternary ammonium anion exchange resin in bead or other particulate form. The solution can be passed through the resin by upward or downward flow. Flooded bed operation can be used or one can employ the trickle-flow method in which the solution is dispersed over the bed, using a gas for maintaining the liquid as a relatively thin film on the resin surface.

When the quaternary ammonium, tertiary sulfonium or other chosen strong base anion exchange resin salt begins to approach exhaustion as evidenced by the appearance in the effluent of the acid which is being removed, the resin is regenerated. In this connection, it will be noted that the capacity of a given strong base anion exchange resin will be lower than in conventional methods of purification by ion exchange with such resins, since at the end of the operating or exhausting cycle the active sites on the resin will be occupied by both the ions being removed from the liquid and those forming the salt in the starting resin salt. When using the resin salt in column operation, as is preferred, it is usually advantageous to back wash the resin before regeneration. This upflow of washing liquid, which is preferably water when aqueous solutions are being purified, loosens and reclassifies the resin particles in the bed and promotes uniform regeneration.

Any suitable method can be used for regenerating the strong base anion exchange resin salts prior to their reuse in the process of the invention. One can, for example, regenerate in the conventional manner by treatment with an appropriate base to convert the resin to the hydroxyl form from which the required salt can then be readily prepared. These resin salts can be conveniently made by ion exchange between the hydroxyl form of the resin and an appropriate salt. Thus, for example, in making salts of quaternary ammonium exchange resins, which are the most advantageous form of strong base anion exchange resin, for use in the process of the invention, one can treat the hydroxyl form of the resin with an acid or a salt of an acid. For instance, an aqueous solution of an alkali metal or ammonium or other salt of the chosen acid can be used. Ammonium monohydrogen phosphate can be used in making the monohydrogen phosphate salt form of the strong base resin, potassium monohydrogen arsenate for making the monohydrogen arsenate form of the resin and stannous hydrogen sulfate for making hydrogen sulfate salts of strong base anion exchange resins, for example.

An alternative method which offers advantages in the preparation of acid salts of strong base anion exchange resins comprises conversion of the resin to the neutral or normal salt followed by acid treatment to form the preferred acid salt. The neutral salt can be produced by treating the resin, with an aqueous solution of a neutral salt of the polybasic acid selected to be the salt former for the exchanger. Tripotassium or trisodium phosphate, for instance, is useful in making phosphate salts which can then be treated with a suitable acid to obtain the acid phosphate salt desired. Controlled treatment with phosphoric acid is one method of converting the neutral phosphates to acid phosphate salts, but other acids can be used. There is special advantage in using carbonic acid, for example, since any carbonate ions on the resin will not be seriously disadvantageous in subsequent use of the resin due to the fact that any exchange which takes place therewith will result mainly in $CO_2$ production and thus minimum contamination of the solution being purified.

The preferred method of regenerating the strong base anion exchange resin salts for use in the new process makes use of reaction with a base to effect selective exchange of the acid (HA) which has been accumulated thereon during the operating cycle. This exchange takes place without removal of the acid employed in making the quaternary ammonium salt. The reaction, when regenerating an acid phosphate salt of the resin, for example, is according to the equation:

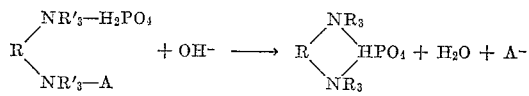

This regeneration with hydroxide ion is especially efficient because it is primarily an acid-base neutralization rather than the conventional anion exchange in which hydroxide ion is known to be an inefficient regenerant.

The following examples illustrate some of the methods which can be used in carrying out the new process and show some of its advantages.

EXAMPLE I

This example illustrates the removal of lower carboxylic acid impurity from an aqueous hydrogen peroxide solution containing 15% wt. $H_2O_2$ and 0.082 normal in carboxylic acid, chiefly formic and acetic acids.

The resin used was "Dowex 1 x 7.5," a trimethylbenzyl ammonium poly(styrene-divinyl benzene) anion exchange resin of 20–50 mesh size. A bed of this resin 23 cm. deep and containing 100 ml. of resin was treated with 500 ml. of 5% wt. disodium monohydrogen phosphate to convert the resin to its monohydrogen phosphate salt form. After washing out the excess sodium phosphate, the hydrogen peroxide solution was passed through the bed at a flow rate of four bed volumes per hour, using conventional downflow, liquid flooded bed operation, samples of the effluent being collected periodically and analyzed.

The acids were removed from the peroxide solution quantitatively (0.000 normal acid in product) until 75% of the capacity of the bed had been utilized. The capacity of the resin for acid removal in this operation was approximately half of the total sites on the resin. There was no loss of hydrogen peroxide in the process.

These results are in contrast to those obtained in conventional methods of using anion exchange resins in the free base form or in the form of salts of monobasic acids which involve exchange of anions for removal of acid impurities. Strong base resins cannot be used in their hydroxyl form because the high pH leads to undesirable hydrogen peroxide decomposition. Weak base resins as normally used for removing unionized acids from aqueous solutions besides being also so high in pH as to promote peroxide decomposition are not capable of as complete removal of acid as is the salt form of quaternary ammonium anion exchange resins used in the invention. This was shown by tests with the same Dowex 1 x 7.5 resin used in Example I but in the form of its dihydrogen phosphate salt, with which acid removal is not by the process of the invention but rather by the conventional anion exchange process. In that form the resin was very much less efficient in removing acids. Thus when the resin was converted to its —$H_2PO_4$ salt by treatment with 500 ml. of 5% wt. sodium dihydrogen phosphate solution and then used under the same conditions to treat the same hydrogen peroxide solution, at no time was the acid removal quantitative. The best product cut obtained was 0.03 normal in acid, and the total capacity of the resin for acid removal was only about 10% of that achieved in Example I.

In another test of removal of acetic acid from hydrogen peroxide by conventional exchange of anions instead of the process of the invention, a 100 ml. bed of Dowex 1 x 7.5 anion exchange resin in monohydrogen phosphate salt form was treated with a solution of the impure hydrogen peroxide neutralized with sodium hydroxide to pH 6.0 so that the exchange reaction took place according to the equation:

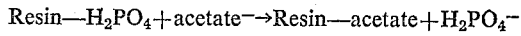

Again the acid removal was at no time quantitative, the best product being one 0.04 N in acids when using the peroxide solution of Example I. The total capacity of the resin for acid removal was also significantly reduced and the solution was contaminated by phosphate.

EXAMPLE II

A bed of Dowex 1 x 7.5 anion exchange resin 23 cm. deep and containing 100 ml. of resin was treated with 1000 ml. of 5% wt. trisodium phosphate followed by a trickle phase wash with water and carbon dioxide gas until the pH of the effluent fell below 7. This resulted in a resin bed with about ⅔ of the sites in monohydrogen phosphate salt form, the remainder being in the form of bicarbonate salts. The bed was used to purify the same hydrogen peroxide solution as that employed in Example I, the bed being operated trickle phase with a flow rate of peroxide solution of 1300 ml. per hour accompanied by air at a flow rate of 85 liters per hour.

Acid removal by the bed was quantitative (0.000 N acids in product) until 71% of the capacity of the bed had been utilized and the total capacity of the bed for acid removal was 40% greater than the bed in Example I.

Good results can also be obtained by using the tertiary sulfonium strong base anion exchange resin Duolite ES101 instead of Dowex 1 x 7.5 in making the resin salt.

EXAMPLE III

This example illustrates the removal from solution of unsaturated carboxylic acids which are subject to undesired polymerization at high pH.

A bed of "Amberlite IRA-400" quaternary ammonium ion exchange resin of the insoluble, cross-linked copolymer type is converted to the arsenic acid salt by treatment with an aqueous solution of disodium arsenate of about 5% concentration. The excess salt is washed out of the bed and a solution of acrylic acid is passed through the bed using downflow, liquid flooded bed operation. The pK of acrylic acid is 4.26 compared with $pK_{H_2AsO_4}-$ 7.08 and $pK_{H_3AsO_4}-$ 2.30. Substantially quantitative removal of the acrylic acid can be obtained until almost half of the exchange capacity of the resin is taken up thereby and no detachable loss of acrylic acid through polymerization takes place.

In the same way any of the following unsaturated carboxylic acids can be removed from liquids in which they are present.

Acid (HA): $pK_{HA}$
Allylacetic _____ 4.68
Beta-allylpropionic _____ 4.72
Beta-(iso-butenyl)-propionic _____ 4.80
Vinylacetic _____ 4.35
Ethylacrylic _____ 4.69

Since $pK_{HA}$ for these acids all lie in the range 4.3 to 4.8, any of the following anions can be used instead of $HAsO_4=$ in preparing the quaternary ammonium salt which can then be employed in the same way for their removal without danger of polymerization:

| Acid name | Anion B- | $pK_{HB}-$ | $pK_{H_2B}$ |
|---|---|---|---|
| Maleic | $C_4H_2O_4=$ | 6.26 | 2.00 |
| Phosphoric | $HPO_4=$ | 7.21 | 2.12 |
| Phosphorous | $HPO_3=$ | 6.15 | 1.80 |
| Selenious | $SeO_3=$ | 7.30 | 2.52 |
| Sulfurous | $SO_3=$ | 7.20 | 1.76 |

While special applications of the process of the invention in which the new method has outstanding advantages because of its effectiveness in removing acids without exposing the liquid to undesirably high pH have been illustrated in the foregoing examples, it will be understood that the invention is not limited thereto but can be successfully applied to the removal of acids from aqueous or nonaqueous peroxide media of any kind whether or not pH control is essential in the operation.

EXAMPLE IV

The removal of inorganic acids from aqueous solution is illustrated by the following separations which can be carried out by the technique employed in Example I but using the indicated salts of Dowex 2 or Nalcite SAR quaternary ammonium base resins:

| Inorganic acid removed (HA) | $pK_{HA}$ | Acid from which resin salt is derived | Anion (B) initially on resin | $pK_{HB}$ | $pK_{H_nB}$[1] |
|---|---|---|---|---|---|
| Hydrofluoric acid (HF) | 3.14 | Glycerophosphoric acid or Pyrophosphoric acid | $C_3H_7O_6P=$ | 6.19 | 1.47 |
| Periodic acid (HIO$_4$) | 3.40 | Pyrophosphoric acid | $HP_2O_7=$ | 6.68 | 0.85 |
| Hydrazoic acid (HN$_3$) | 4.59 | Maleic acid or Arsenic acid or Sulfurous acid | $C_4H_2O_4=$ | 6.26 | 2.00 |
| | | | $HAsO_4=$ | 7.08 | 2.30 |
| | | | $SO_3=$ | 7.20 | 1.76 |
| Hypochlorous acid (HClO) | 7.46 | Arsenic acid or Phosphorous acid or Pyrophosphoric acid or Salicylic acid | $AsO_4\equiv$ | 9.22 | 2.30 |
| | | | $PO_3\equiv$ | 9.70 | 1.80 |
| | | | $P_2O_7\equiv$ | 9.39 | 0.85 |
| | | | $C_7H_4O_3=$ | 13.44 | 2.97 |
| Hydrocyanic acid (HCN) | 9.14 | Hydrosulfuric acid | $S=$ | 14.92 | 7.27 |
| Stannic acid (H$_2$SnO$_3$) | 9.44 | Salicylic acid or | $C_7H_4O_3=$ | 13.44 | 2.97 |
| Boric acid (H$_3$BO$_3$) | 9.24 | 1,2-diaminocyclo-hexane-N,N,N',N'-tetraacetic acid. | 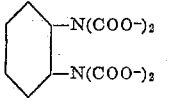 | 11.7 | 2.4 |

[1] $H_nB$ represents the most protonated form of the anion B.

Other examples of substrate acids which can be removed from liquids using the methods of the foregoing examples:

*Examples of Substrate Acids To Remove*

[pK = −log K]

| Acid | Formula | $pK_1$ |
|---|---|---|
| Adipic | $H_2C_6H_8O_4$ | 4.43 |
| Barbituric | $HC_4H_3O_3N_2$ | 3.98 |
| Benzoic | $HC_7H_5O_2$ | 4.20 |
| Bromoacetic | $HC_2H_2O_2Br$ | 2.87 |
| p-Bromobenzoic | $HC_7H_4O_2Br$ | 3.97 |
| t-Butylbenzoic | $HC_{11}H_{13}O_2$ | 4.40 |
| m-Butyric | $HC_4H_7O_2$ | 4.82 |
| m-Caproic | $HC_6H_{11}O_2$ | 4.83 |
| m-Caprylic | $HC_8H_{15}O_2$ | 4.90 |
| Chloroacetic | $HC_2H_2O_2Cl$ | 2.86 |
| Citraconic | $H_2C_5H_4O_4$ | 2.48 |
| Crotonic (trans) | $HC_4H_5O_2$ | 4.70 |
| Cyanuric | $C_3H_2O_3N_3$ | 6.74 |
| Formic | $HCHO_2$ | 3.75 |
| Gallic | $HC_7H_5O_5$ | 4.40 |
| Glycine | $HC_2H_4O_2N$ | 9.78 |
| Glycolic | $HC_2H_3O_3$ | 3.82 |
| Lactic | $HC_3H_5O_3$ | 3.86 |
| Periodic | $HIO_4$ | 1.64 |
| Phenol | $HC_6H_5O$ | 9.89 |
| p-Phenoxybenzoic | $HC_{13}H_9O_3$ | 4.52 |
| Picolinic | $HC_6H_4O_2N$ | 5.30 |
| Pyromucic | $HC_5H_3O_3$ | 5.15 |
| p-Toluic | $HC_8H_7O_2$ | 4.37 |
| Uric | $C_5H_4O_3N_4$ | 3.89 |
| Vanillic | $HC_8H_7O_4$ | 4.52 |

Quaternary ammonium ion exchange resin salts which are suitable for carrying out the removal of these substrate acids include, for example, those made from the following acids using anions selected so that $pK_{HB}$ is more than $pK_{HA}$ which in turn is more than $pK_{H_nB}$ where $H_nB$ is the most protonated form of the anion used in making the resin salt.

Acid Dissociation Constants for Polybasic Acids

EXAMPLES OF ACIDS TO BE USED ON THE RESIN
[pK = −log K]

| Acid | Formula | $pK_{H_mB}$[1] | $pK_{H_{m-1}B}$ | $pK_{H_{m-2}B}$ | $pK_{H_{m-3}B}$ |
|---|---|---|---|---|---|
| Arsenic | $H_3AsO_4$ | 2.30 | 7.08 | 9.22 | |
| Carbonic | $H_2CO_3$ | 6.37 | 10.25 | | |
| Citric | $H_3C_6H_5O_7$ | 3.06 | 4.74 | 5.40 | |
| Fumaric | $H_2C_4H_2O_4$ | 3.03 | 4.47 | | |
| Glycerophosphoric | $H_2C_3H_7O_5P$ | 1.47 | 6.19 | | |
| Hydrosulfuric | $H_2S$ | 7.24 | 14.92 | | |
| p-Hydroxybenzoic | $H_2C_7H_4O_3$ | 4.48 | 9.40 | | |
| Itaconic | $H_2C_5H_4O_4$ | 3.84 | 5.55 | | |
| Maleic | $H_2C_4H_2O_4$ | 2.00 | 6.26 | | |
| Malic | $H_2C_4H_4O_5$ | 3.40 | 5.05 | | |
| Malonic | $H_2C_3H_2O_4$ | 2.85 | 6.10 | | |
| Oxalic | $H_2C_2O_4$ | 1.19 | 4.21 | | |
| Phosphoric | $H_3PO_4$ | 2.12 | 7.21 | 12.32 | |
| Phosphorous | $H_3PO_3$ | 1.80 | 6.15 | 9.70 | |
| o-Phthalic | $H_2C_8H_4O_4$ | 2.89 | 5.41 | | |
| Pyrophosphoric | $H_4P_2O_7$ | 0.85 | 1.96 | 6.68 | 9.39 |
| Salicylic | $H_2C_7H_4O_3$ | 2.97 | 13.44 | | |
| Selenious | $H_2SeO_3$ | 2.52 | 7.30 | | |
| Succinic | $H_2C_4H_4O_4$ | 4.19 | 5.57 | | |
| Sulfuric | $H_2SO_4$ | 0.40 | 1.92 | | |
| Sulfurous | $H_2SO_3$ | 1.76 | 7.20 | | |
| Tartaric | $H_2C_4H_4O_6$ | 3.02 | 4.54 | | |
| Telluric | $H_2TeO_4$ | 6.22 | 7.70 | | |
| 1,2-diaminocyclohexane-N,N'-Tetraacetic acid. | 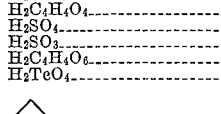 | 2.4 | 3.5 | 6.1 | 11.7 |

[1] $H_mB$ is the fully-protonated (zero charge) form of anion B. Thus, $pK_{H_mB} = pK_1$ in the usual terminology.

These examples are merely illustrative of one modification of the invention which generically comprises removal of acids from hydrogen peroxide solutions by contacting them with a strong base anion exchange resin salt in which the salt-forming anion is directly linked to a plurality of active sites of the resin, said salt-forming anion being one whose most protonated form has a pK less than that of the acid being removed from the liquid, while the pK of the conjugate base of the form of the acid used in making this salt is greater than the pK of the acid being removed. By strong base anion exchange resin as herein referred to, is meant one whose hydroxide has a dissociation constant which is of the order of one, in other words is strongly basic compared with exchange resins having primary, secondary or tertiary amine functional group, for instance, exchange resins from condensation of amines with aldehydes.

Another modification of the invention comprises removal of bases from liquids by means of salts of cationic exchange resins since by choosing a salt of an acid resin and a polyvalent base in which the cation is linked at a plurality of exchange sites and is less basic than the base (Y.OH) to be removed from the liquid but has a form which is more basic than Y.OH so will not be displaced by exchange. This modification of the invention is exemplified by the use of a pyridyl piperidine or aminomethyl aniline salt of a strong acid cation exchange resin such, for example, as Amberlite IR-120 produced by Rohm and Haas Company, Chempro C-20 and Duolite C-25 of Chemical Process Company, Dowex 50 of Dow Chemical Company, Nalcite HCR of National Aluminate Corporation and Permutit Q of Permutit Company. When such salts are used to remove ammonia, for instance, from aqueous solution, mixed salts of the cation exchange resin are formed and contamination of the solution by cation from the resin is avoided. The invention in its broadest form will include this modification. Many variations can thus be made in the new process, without departing from the invention which is not restricted to the examples which have been used to illustrate certain of its advantageous modification, nor by any theory which has been proposed in explanation of the improved results which are obtained.

We claim as our invention:

1. A process for removing a monocarboxylic acid (HA) having a single acid dissociation constant $K_{HA}$ between $10^{-4}$ and $10^{-5}$ from hydrogen peroxide which comprises contacting the hydrogen peroxide with a salt of a di- to tetra-basic acid $H_nB$, wherein $n$ is a whole number from 2 to 4, and a strong base selected from the group consisting of a quaternary ammonium base anion exchange resin and a tertiary sulfonium base anion exchange resin, the salt having polyvalent anions of the polybasic acid each linked to from 2 to 4 exchange sites of the resin, the polybasic acid $H_nB$ having a first acid dissociation constant which is greater than the acid dissociation constant $K_{HA}$ of the monocarboxylic acid and having another dissociation constant for the monoprotonated form of the polyvalent anion which is attached to the 2 to 4 sites of the resin which is less than that of the monocarboxylic acid, thereby binding the monocarboxylic acid to the resin salt without releasing free polybasic acid $H_nB$ and separating the hydrogen peroxide from the resulting resin mixed salt of both the acids HA and $H_nB$, the pH of the hydrogen peroxide being maintained below about 6.5 throughout contact with the resin salt.

2. A process in accordance with claim 1, wherein said first and said another acid dissociation constants of the polybasic acid $H_nB$ each differ from the acid dissociation constant of the monocarboxylic acid such that the difference between the negative logarithms to the base 10 of the corresponding dissociation constants is at least 1.5.

3. A process in accordance with claim 1, wherein the anion exchange resin salt is a salt of a tribasic acid.

4. A process in accordance with claim 3, wherein the anion exchange resin salt is an arsenate.

5. A process for removing a monocarboxylic acid having an acid dissociation constant between $10^{-4}$ and $10^{-5}$ from hydrogen peroxide which comprises contacting the acid-containing hydrogen peroxide with a quaternary ammonium base anion exchange resin initially substantially completely in salt form with di- to tetra-valent anions of a di- to tetra-basic acid, with the anion of the salt having a monoprotonated form which has a dissociation constant of not more than $10^{-6}$ and having a more fully protonated form which has a dissociation constant of not less than $10^{-3}$, thereby binding the monocarboxylic acid to the resin salt without releasing free polybasic acid and separating the hydrogen peroxide from the resulting resin mixed salt of both of said acids, the pH of the hydrogen peroxide being maintained below about 6.5 throughout the treatment.

6. A process for removing acetic acid from hydrogen peroxide which comprises contacting the hydrogen peroxide with a salt of a di- to tetra-basic acid $H_nB$, wherein $n$ is a whole number from 2 to 4, and a quaternary ammonium base anion exchange resin, the salt having polyvalent anions of the polybasic acid each linked to from 2 to 4 exchange sites of the resin, the polybasic acid $H_nB$ having a first acid dissociation constant which is greater than the acid dissociation constant of the acetic acid and having another dissociation constant for the mono-protonated form of the polyvalent anion which is attached to the 2 to 4 sites of the resin which is less than that of the acetic acid, thereby binding the acetic acid to the resin salt without releasing free polybasic $H_nB$ and separating the hydrogen peroxide from the resulting resin mixed salt of both the acetic acid and $H_nB$, the pH of the hydrogen peroxide being maintained below about 6.5 throughout contact with the resin salt.

7. A process for removing a monocarboxylic acid having an acid dissociation constant betwene $10^{-4}$ and $10^{-5}$ from hydrogen peroxide which comprises contacting the acid-containing hydrogen peroxide with the monohydrogen phosphate salt form of a quaternary ammonium base anion exchange resin thereby binding the monocarboxylic acid to the resin salt without releasing free polybasic acid and separating the hydrogen peroxide from the resulting resin mixed salt of both acids, the pH of the hydrogen peroxide being maintained below about 6.5 throughout the treatment.

References Cited in the file of this patent

UNITED STATES PATENTS

| | | |
|---|---|---|
| 2,591,573 | McBurney | Apr. 1, 1952 |
| 2,772,237 | Baumann et al. | Nov. 27, 1956 |
| 2,868,832 | Taylor et al. | Jan. 13, 1959 |

FOREIGN PATENTS

| | | |
|---|---|---|
| 826,015 | Great Britain | Dec. 23, 1959 |
| 237,658 | Spain | Nov. 2, 1957 |
| 167,414 | Austria | Jan. 10, 1951 |
| 190,904 | Austria | July 25, 1957 |